United States Patent
Bradbrook et al.

(10) Patent No.: US 9,366,260 B2
(45) Date of Patent: Jun. 14, 2016

(54) SPOOL FOR TURBO MACHINERY

(71) Applicant: ROLLS-ROYCE PLC, London (GB)

(72) Inventors: Stephen John Bradbrook, North Somerset (GB); Brian Davis, Bristol (GB)

(73) Assignee: ROLLS-ROYCE plc, London (GB)

( * ) Notice: Subject to any disclaimer, the term of this patent is extended or adjusted under 35 U.S.C. 154(b) by 540 days.

(21) Appl. No.: 13/920,466

(22) Filed: Jun. 18, 2013

(65) Prior Publication Data
US 2014/0003928 A1 Jan. 2, 2014

(30) Foreign Application Priority Data
Jun. 29, 2012 (GB) .................................. 1211537.4

(51) Int. Cl.
*F04D 19/02* (2006.01)
*F02C 3/08* (2006.01)

(52) U.S. Cl.
CPC .. *F04D 19/02* (2013.01); *F02C 3/08* (2013.01)

(58) Field of Classification Search
CPC .................................. F04D 19/02; F02C 3/08
USPC ..................................................... 416/198 A
See application file for complete search history.

(56) References Cited

U.S. PATENT DOCUMENTS

| | | | |
|---|---|---|---|
| 2,640,319 A | 6/1953 | Wislicenus | |
| 3,546,880 A * | 12/1970 | Schwaar | .................. F02C 3/08 |
| | | | 415/143 |
| 3,722,215 A | 3/1973 | Zhdanov et al. | |
| 4,678,398 A | 7/1987 | Dodge et al. | |
| 5,094,069 A | 3/1992 | Boffo | |
| 6,488,469 B1 | 12/2002 | Youssef et al. | |

FOREIGN PATENT DOCUMENTS

| | | |
|---|---|---|
| EP | 0 349 051 A1 | 1/1990 |
| GB | 622089 | 4/1949 |
| GB | 1 280 113 | 7/1972 |
| WO | WO 2011/000821 A1 | 1/2011 |

OTHER PUBLICATIONS

Sep. 20, 2012 British Search Report issued in British Patent Application No. GB1211537.4.

* cited by examiner

*Primary Examiner* — Igor Kershteyn
*Assistant Examiner* — Aaron R Eastman
(74) *Attorney, Agent, or Firm* — Oliff PLC

(57) ABSTRACT

A spool for turbo machinery comprises a fluid flow path defined by an axial compressor stage adjacent to a mixed flow compressor stage to thereby provide a compression system which has a relatively high ratio of efficiency to compressor diameter.

16 Claims, 2 Drawing Sheets

SPOOL FOR TURBO MACHINERY

This invention claims the benefit of UK Patent Application No. 1211537.4, filed on 29 Jun. 2012, which is hereby incorporated herein in its entirety.

FIELD OF THE INVENTION

The present disclosure relates to a spool for turbo machinery.

BACKGROUND TO THE INVENTION

Turbo machinery, for example turbine engines, generally comprises a compression system. The compressor is powered by a turbine, with the compressor and turbine forming what may be referred to as a spool. Commonly in gas turbines the compressor is exclusively axial flow in nature. The disadvantage of an all axial compressor is that at small engine sizes the final stages of the compressor become very small which results in large aerodynamic losses and poor compressor efficiency.

It is known to combine different compressor configurations in turbo machinery designs. In U.S. Pat. No. 4,678,398 (Dodge et al.) there is described mixed flow compressor upstream of an axial flow compressor. While resistant foreign object damage, this design does not address the issue of poor efficiency of the downstream axial compressor if the final stages of that compressor are physically small. In U.S. Pat. No. 6,488,469 (Youssef et al) there is described a mixed flow compressor upstream of a circumferential compressor. Whilst aerothermally efficient at small engine sizes, this latter design will result in relatively large engine diameter due to the size requirements of the circumferential compressor.

Hence a compression system which has a relatively high ratio of efficiency to compressor diameter, which avoids the need for small rotor blade size, with no penalty on operational envelope, is highly desirable.

STATEMENTS OF INVENTION

Accordingly there is provided a spool for turbo machinery comprising a fluid flow path defined by an axial compressor stage adjacent a mixed flow compressor stage.

Thus there is provided a compressor assembly of high efficiency with a compressor of improved reduced diameter and which suffers no operational envelope penalty compared to devices of the related art.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

Examples of the present disclosure will now be described with reference to the accompanying drawings, in which.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 1:
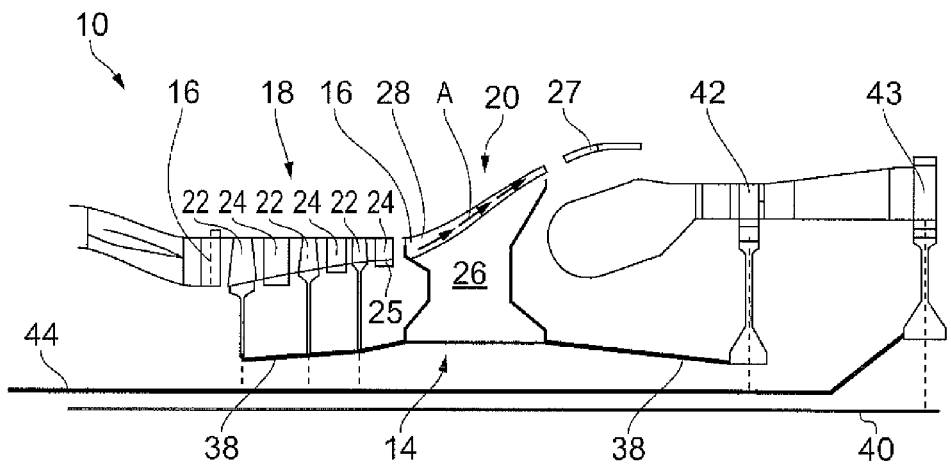
FIG. 1 shows a turboshaft gas turbine engine incorporating a combined axial and mixed flow compressor according to the present disclosure.
Figure 2:
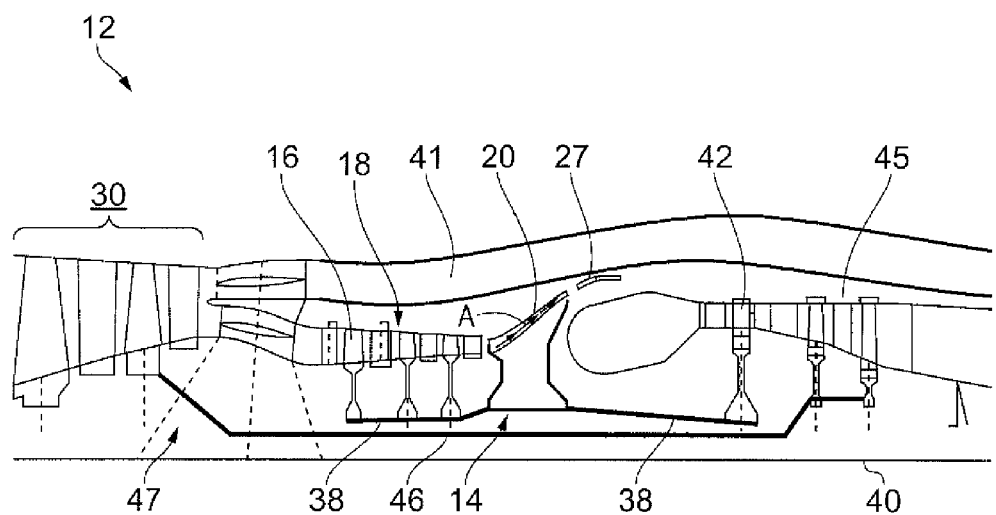
FIG. 2 shows a low bypass ratio turbofan gas turbine incorporating a combined axial and mixed flow compressor according to the present disclosure.
Figure 3:
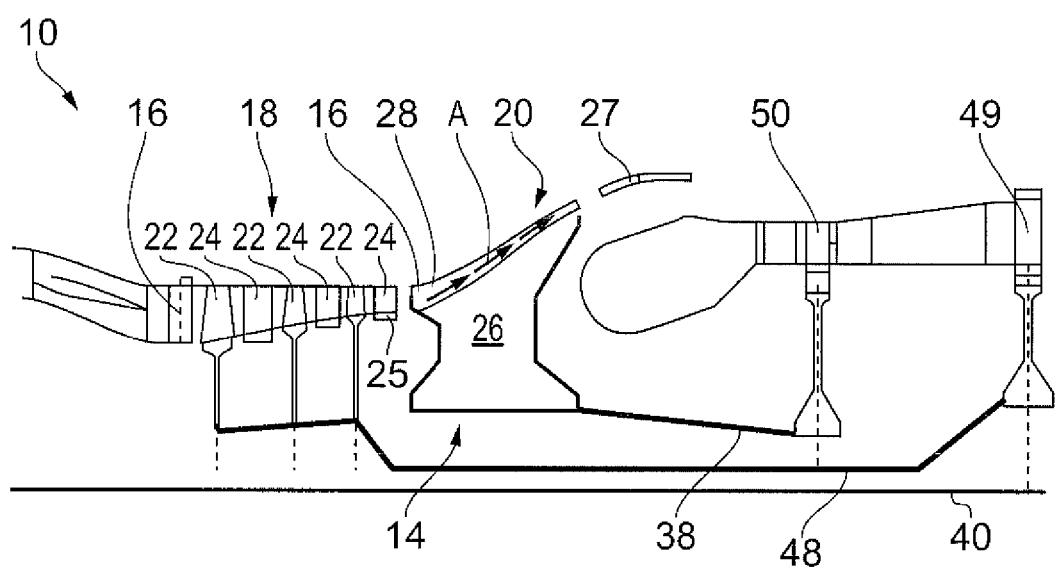
FIG. 3 shows an alternative arrangement of the core turbomachinary of FIG. 1 and FIG. 2 where the axial flow compressor and mixed flow compressor are driven by separate turbines.

FIG. 1, FIG. 2 and FIG. 3 show alternative examples of the spool of the present disclosure. Both show spools for turbo machinery, for example turbine engines. FIG. 1 shows a turboshaft engine 10, and FIG. 2 shows a turbofan engine 12. Throughout this specification common features share the same reference numerals. FIG. 3 shows an alternative arrangement for the engine core turbomachinary which could be applied either a turbohsaft or a turbofan.

With reference to FIG. 1, the turbo shaft engine 10 comprises a core spool 14 comprising a fluid flow path 16 defined by an axial compressor stage 18 adjacent and upstream of a mixed flow compressor stage 20. In the context of the present disclosure, an axial compressor stage comprises one or more arrays of compressor rotor blades 22. It may, as in the examples shown, comprise compressor stator vanes 24 located between the arrays of rotor blades 22 and downstream of the last array of compressor rotor blades 22, such that an array of stator vanes 24 are upstream of the mixed flow compressor stage 20. In this example, the axial compressor 18 is immediately upstream of the mixed flow compressor 20, with no duct, flow passage or transition passage between them, and hence there is direct flow communication between the axial compressor 18 and the mixed flow compressor 20. That is to say the axial compressor 18 leads directly to the mixed flow compressor stage 20. Put another way, the exit from the axial flow compressor 18 is immediately upstream of the inlet to the mixed flow compressor stage 20, with no duct, flow passage or transition passage there between.

In an alternative example the flow path between the axial compressor stage 18 and the mixed flow compressor stage 20 is defined by a non rotatable flow passage. That is to say, the exit from the axial flow compressor stage 18 is separated from the inlet to the mixed flow compressor stage 20 by a duct which provides a flow passage between the two. Hence the radial position of the exit from the axial compressor 18 may be varied relative to the inlet to the mixed flow compressor 20.

In the context of the present disclosure, a "mixed flow compressor" is a device with a rotor (or impeller) which defines a compression flow path 16 with axial and radial components thereby resulting in a rotor blade 26 with a substantially diagonal flow path 28 in a direction away from the shaft 38 and common axis 40. The inlet mean radius is less than at outlet, and the exit flow tends be in an axial or diagonal direction, as shown by arrows A in the Figures, rather than a radial direction. Downstream of the rotor is a static flow passage 27 known as a diffuser which contains an array of vanes. The function of the diffuser is to reduce the mach number of the flow and to reduce the level of flow swirl (flow circumferential to the common axis 40).

The turbo fan example of FIG. 2 differs in that the fluid flow path 16 through the engine comprises a fan 30 upstream of the axial compressor stage 18 and mixed flow compressor stage 20, and further comprises a bypass duct 41 radially outward of the flow path 16.

In the example of FIG. 2 the fan 30 comprises of two stages of axial flow compression. In an alternative example the fan may comprise of one or more stages of compression. In yet a further example of the disclosure, additional stages of axial compression may be attached to the fan to work only on the core stream flow path 16.

In the examples of FIGS. 1 and 2 the axial compressor stage 18 and the mixed flow compressor stage 20 are mounted to a common shaft 38. The shaft 38 is rotatable about an axis 40, and hence the axial compressor stage 18 and the mixed flow compressor stage 20 are likewise rotatable about the same axis 40. A turbine stage 42 is mounted to the common shaft 38 and also rotatable about the common axis 40. The combination of the rotating parts of the axial compressor stage 18, mixed flow compressor stage 20, turbine stage 42 and shaft 38 collectively make up the high pressure spool 14.

With reference to FIG. 1, the turbo shaft engine 10 has a power turbine 43 which delivers shaft power via a shaft 44. In the example illustrated, the power turbine is free to rotate at a speed independent of the speed of the high pressure spool 14. In an alternative example shaft 44 and the high pressure spool 14 may be physically connected such that the two are constrained to rotate at the same speed or speed ratio.

With reference to FIG. 2, the turbofan engine 12 has a low pressure turbine 45 which drives the fan 38 via a shaft 46 collectively referred to as a low pressure spool 47. In the example illustrated, the low pressure spool is free to rotate at a speed independent of the speed of the high pressure spool 14. In an alternative example the low pressure spool 47 and the high pressure spool 14 may be physically connected such that the two are constrained to rotate at the same speed or speed ratio.

In a further example, a third intermediate pressure spool may be included comprising of an axial compressor, positioned between the fan 30 and the axial compressor stage 18, which is driven by an additional turbine stage, positioned between the high pressure turbine 42 and the low pressure turbine 45, and joined together by an additional shaft.

In the example of FIG. 3 the axial flow compressor 18 is driven by a dedicated turbine 49 via a shaft 48 and the mixed flow compressor 20 is driven by a separate turbine 50 via a shaft 48. This provides the advantage that the two compressors are not physically connected and therefore are not constrained to operate at the same speed or speed ratio. This arrangement of the core turbomachinery components can replace the axial compressor 18 and mixed flow compressor 20 and turbine 42 of either the turboshaft arrangement of FIG. 1 or the turbofan arrangement of FIG. 2.

The axial compressor stage 18 has a nominal compression ratio selected from the range of 1.4 to 20. In an alternative example the axial compressor stage 18 has a nominal compression ratio selected from the range of 2.4 to 4. The mixed flow compressor stage 20 has a nominal compression ratio selected from the range of 1.4 to 5. In a further example the mixed flow compressor stage 20 has a nominal compression ratio selected from the range of 2.6 to 3.8.

The combined (or overall) design pressure ratio of the spool 14 at a nominal design speed may be in the range of 4.0 to 35.

In further alternative examples the axial compressor 18 and mixed flow compressor 20 are configured to, in use, achieve pressure ratios selected from the following combinations to achieve the combined (or overall) pressure ratio also stated below. That is to say the axial compressor 18 and mixed flow compressor 20 have a nominal compression ratio selected from the following combinations:

| Axial Compressor Pressure Ratio | Mixed Flow Compressor Pressure Ratio | Combined Compressor Pressure Ratio |
|---|---|---|
| 3.3 | 3.3 | 11 |
| 4.0 | 3.8 | 15 |
| 2.4 | 2.6 | 6.2 |
| 3.9 | 2.5 | 9.7 |
| 4.5 | 2.1 | 9.5 |
| 5.9 | 1.8 | 10.6 |
| 5.9 | 3.8 | 22.4 |

Hence the compressors are configured such that, at a nominal design speed, they have a compression ratio of a value in the said ranges. Their design compression ratios will be substantially fixed, although in use the actual pressure ratio will vary slightly as rotational speed, air temperature, humidity and other operational conditions vary.

The pressure ratio of the different compressor stages is dependent upon a number of factors. For example there is a maximum pressure ratio which can be achieved in a single stage of mixed flow compressor which is dependent on the temperature at which the compressor will operate. Generally, a pressure ratio of greater than 5 for a mixed flow compressor is likely to be technically difficult to achieve.

The examples herein disclosed are best suited to a compressor with an exit non-dimensional mass flow of 0.5 kg·K$^{0.5}$·kPa$^{-1}$ or less. Where non-dimensional flow is given by the equation:

$$W \cdot T^{0.5}/P$$

Where W is the mass flow, T is total temperature and P is total pressure of the flow at exit from the mixed flow compressor stage 20.

In operation, fluid enters the fluid path 16 defined by the spool 10 in an axial direction and is passed along the fluid path 16, being first compressed in the axial compressor stage 18 and then the mixed flow compressor stage 20. Fluid passing through the spool 14 along the fluid flow path 16 exits the axial compressor 18 and immediately enters the mixed flow compressor stage 20, where its direction of travel is turned away from the axial direction such that it has a radial component of travel as well as an axial component of travel, as indicated by arrows A. The mixed flow compressor 20 generates pressure by accelerating the fluid to a high speed and converting the velocity head into pressure head.

The axial flow compressor thus performs a stage of compression to a first pressure, and the mixed flow compressor performs a stage of compression to a higher second pressure. The mixed flow compressor 20 is placed downstream of the axial compressor 18 so that the mixed flow compressor can efficiently achieve the required higher second pressure for compressors having a non-dimensional mass flow of about 0.5 kg·K$^{0.5}$·kPa$^{-1}$ or less. That is to say, a mixed flow compressor will achieve the required compression ratio without suffering the losses that an all axial flow compressor would.

With regard the different examples of FIG. 1 and FIG. 2, the only difference between the turboshaft of FIG. 1 and turbofan of FIG. 2 is that with the turbofan there is some pressure boosting ahead of the axial compressor 18 by the fan 30, and therefore the pressures and temperatures throughout the compressor will be greater. The mixed flow compressor 20 is ideally suited to achieve the final stage of compression for medium to small compressor arrangements (for example spools configured to pass a non-dimensional mass flow of about 0.5 kg·K$^{0.5}$·kPa$^{-1}$ or less).

The device of the present disclosure thus provides the advantage of aerothermal efficiency whilst providing a configuration with a lower compressor diameter, and hence lower overall engine diameter, compared to the solutions of the related art described above. A lower engine diameter means that the engine may be easier to mount in its associated vehicle (for example an aircraft engine in an aeroplane structure) because it will be smaller and consequently lighter. A combined axial and mixed flow compressor of the present disclosure is likely to have lower unit cost than an equivalent all-axial and combined axial and radial flow compressors.

Additionally the device of the present disclosure has a better efficiency than an all axial compressor for a given low non-dimensional flow rate by avoiding the need for prohibitively small rotor blades, for example rotor blades having an aerodynamic portion of less than about 15 mm. A mixed flow compressor is also easier to manufacture than an axial flow compressor at least because it comprises less parts.

The flow exiting the mixed flow compressor will be travelling at an angle of less than 90 degrees to the common axis 40, as shown by the arrows A. It may also be directed back towards a direction parallel to the common axis 40. Such arrangements obviate the need for a relatively large diameter exit diffuser common to centrifugal compressors, thereby reducing engine size and weight.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

What is claimed is:

1. A spool for turbo machinery and having at least one turbine, the spool comprising:
    a common shaft;
    a fluid flow path defined by an axial compressor stage adjacent to a mixed flow compressor stage, the axial compressor stage and the mixed flow compressor stage being mounted to the common shaft, and the axial compressor stage and the mixed flow compressor stage being rotatable about a common axis, wherein
    the axial compressor stage and the mixed flow compressor stage are both driven by the at least one turbine.

2. The spool as claimed in claim 1, wherein the axial compressor stage is upstream of the mixed flow compressor stage.

3. The spool as claimed in claim 1, wherein the axial compressor stage is in direct fluid communication with the mixed flow compressor stage.

4. The spool as claimed in claim 1, wherein the flow path between the axial compressor stage and the mixed flow compressor stage is defined by a non rotatable flow passage.

5. The spool as claimed in claim 1, wherein the fluid flow path is further defined by a turbine stage mounted to the common shaft and rotatable about the common axis.

6. The spool as claimed in claim 1, wherein the axial compressor stage has a nominal compression ratio selected from a range of 1.4 to 20.

7. The spool as claimed in claim 6, wherein the axial compressor stage has the nominal compression ratio selected from the range of 2.4 to 4.

8. The spool as claimed in claim 1, wherein the mixed flow compressor stage has a nominal compression ratio selected from a range of 1.4 to 5.

9. The spool as claimed in claim 8, wherein the mixed flow compressor stage has the nominal compression ratio selected from the range of 2.6 to 3.8.

10. The spool as claimed in claim 1, the axial compressor and mixed flow compressor has a nominal compression ratio selected from the following combinations:

| Axial Compressor Pressure Ratio | Mixed Flow Compressor Pressure Ratio |
| --- | --- |
| 3.3 | 3.3 |
| 4.0 | 3.8 |
| 2.4 | 2.6 |
| 3.9 | 2.5 |
| 4.5 | 2.1 |
| 5.9 | 1.8 |
| 5.9 | 3.8. |

11. A turboshaft engine comprising the spool as claimed in claim 1.

12. A turbofan engine comprising the spool as claimed in claim 1, wherein the fluid flow path through the turbofan engine includes a fan and/or further compressor stage upstream of the axial compressor stage and mixed flow compressor stage.

13. The spool as claimed in claim 1, wherein an exit of the axial compressor stage is directly adjacent to an inlet of the mixed flow compressor stage.

14. The spool as claimed in claim 1, wherein the mixed flow compressor stage includes a rotor blade configured to form a compression flow path extending in an axial or diagonal direction away from the common axis.

15. The spool as claimed in claim 14, wherein the compression flow path exiting the mixed flow compressor stage is traveling at an angle of less than 90 degrees to the common axis.

16. The spool as claimed in claim 1, wherein the axial compressor stage and the mixed flow compressor stage are physically connected so as to operate at an identical speed or an identical speed ratio.

* * * * *